April 23, 1946.  D. S. ANTHONY ET AL  2,398,913
CUTOFF TOOL
Filed May 29, 1944
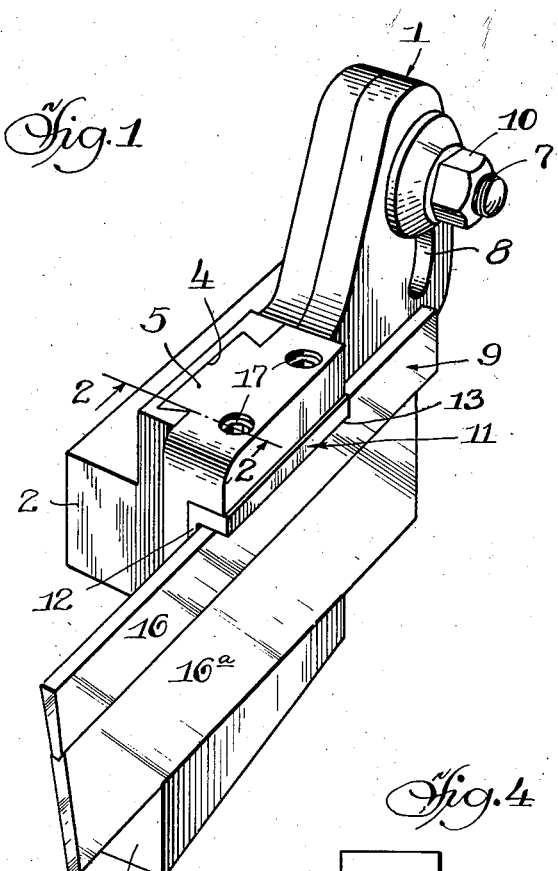
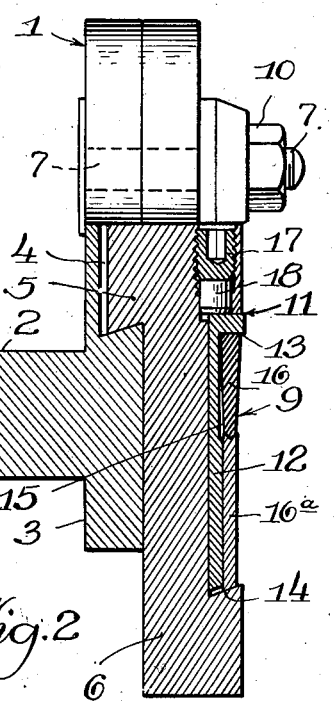
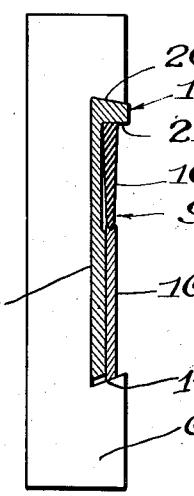
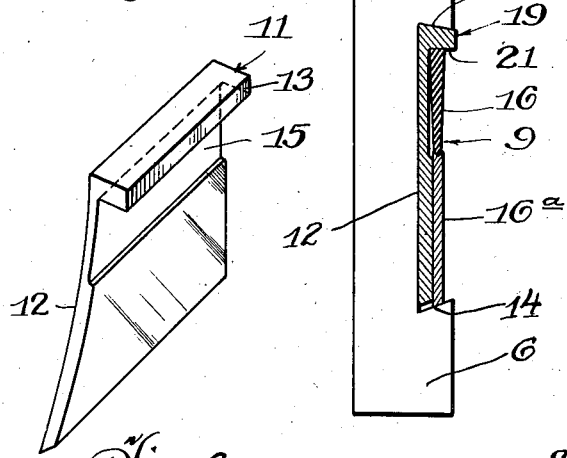
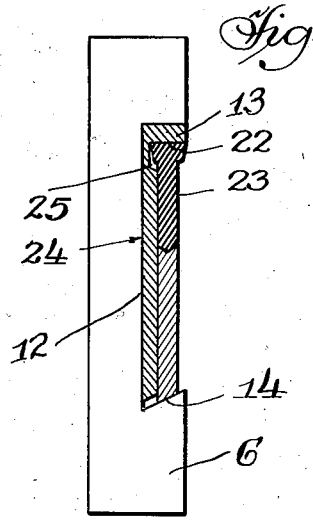
INVENTORS.
David S. Anthony
and William B. Blocker
Parkinson & Lane, Attys.

Patented Apr. 23, 1946

2,398,913

UNITED STATES PATENT OFFICE 2,398,913

CUTOFF TOOL

David S. Anthony and William B. Blocker, San Antonio, Tex., assignors to Anthony Tool Company, San Antonio, Tex., a partnership Application May 29, 1944, Serial No. 537,864

4 Claims. (Cl. 29—96)

The present invention relates to a novel adaptor for cut-off tools and holders of the type and kind disclosed in detail in the Anthony patents Nos. Reissue 21,877 and 2,254,056. These cut-off tools and holders are particularly adapted for use with power-operated lathes, screw machines, boring mills and other machines of the conventional types for quickly and efficiently cutting stock of substantially any diameter or cross section. They are further adapted for use in making deep cuts with machines such as shapers and planers.

Among the objects of the present invention is to provide a novel tool holder and adaptor or attachment therefor in which various types and forms of cutting tools or blades may be quickly assembled and interchanged, and in which the cutting blade is maintained in rigid, adjusted position.

A further object of the invention is the provision of a novel mounting for the cutting blade or tool in which the means such as set screws or the like for adjustably holding or securing the blade or tool in operative position, do not bear against or engage the surface of the blade or tool, but secure the adaptor or attachment in such manner that the blade or tool is uniformly locked or clamped in its predetermined, adjusted position and prevented from being accidentally or unintentionally displaced in use.

In the disclosure of the prior Anthony patents, the cutting blade or tool with or without an auxiliary supporting blade, is mounted in a recess formed or provided in a face of the tool holder. This recess had to be in substantial conformity with the shape or contour of the blade or tool in order to furnish a rigid backing or support therefor, and prevented the use of certain types of blades whose cross section or contour was not sufficiently conformable with that of the recess to insure their being held in rigid, adjusted position under all conditions of use. Furthermore, as the cut-off tools and holders are necessarily made in different sizes for cutting stock that may vary through a wide range of dimensions and relative hardness, it will be evident that were these tool holders each provided with a different shaped recess to accommodate the various shapes of blades or tools now on the market, the number of tool holders and the expense involved would be prohibitive to many manufacturers.

In accordance with the present invention, to use blades of different contour for a particular size of holder, merely requires the substitution of an adaptor contoured to receive that particular blade. This greatly decreases the cost and the requirement in the number and styles of tool or blade holders.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a perspective view of the tool holder and novel adaptor and showing the manner of mounting the cut-off tool or blade within the adaptor and holder.

Figure 2 is a view in vertical cross section taken in a plane represented by the line 2—2 of Figure 1.

Figure 3 is a view in perspective of the novel adaptor shown in Figures 1 and 2.

Figure 4 is a view in vertical cross section through a slightly modified form of adaptor and cut-off tool or blade and showing its manner of mounting in the tool holder.

Figure 5 is a view similar to Figure 4 but disclosing another form of adaptor and cut-off tool or blade.

Referring more particularly to the disclosure in the drawing and especially to the embodiment shown in Figures 1, 2 and 3, the tool holder 1 comprises a shank 2 of any suitable contour for mounting the holder upon a conventional or standard type of turret lathe, although it will be understood that instead of the straight shank shown the shank may be angularly arranged or of any other suitable contour for mounting upon the carriage, tool post or flat top compound of a lathe or other machine.

This shank is provided with a supporting plate 3 having adjacent one end, an arcuate, undercut recess 4 for the reception and pivotal mounting of a complementary shaped trunnion 5 formed or provided on the rear face of the tool support 6. Adjacent its other end, the supporting plate 3 carries a locking bolt 7 adapted to be received in an arcuate slot 8 in the tool support 6 whereby this tool support is permitted limited rotation about its trunnion or fulcrum 5 should the cutting tool or blade 9 be subjected to excessive strain, in which event the tool or blade will be moved out of the path of the work being operated upon and thereby preventing not only damage to the tool and lathe upon which it is mounted, but also protecting the operator against injury. A lock nut 10 normally holds the tool or blade support against such pivotal movement.

In accordance with the present invention, the blade or tool support 6 is recessed in its outer face for the reception of the novel adaptor or attachment 11 provided with a substantially vertically extending wall 12 and an overhanging flange 13. The exterior surfaces of the wall 12 and flange 13 are such that the adaptor conforms to the contour of the upper and interior face of the recess but the lower surface 14 of the recess being undercut to form an inwardly inclined shoulder so as to effectively maintain the blade or tool rigidly and fixed within the support by tipping it inwardly against the wall 12 of the adaptor. Preferably the lower edge of the blade or tool, or the supporting blade where one is employed, is tapered or inclined in a manner similar to that of the shoulder 14.

The interior surface of the wall or plate 12 of the adaptor is slotted or cut away at 15 in order to accommodate the wider or thickened dimensions of the cutting blade or tool 9. As shown in the various figures in the drawing, the blade is preferably formed in two sections, the upper blade or cutting section 16 and a lower support or supporting blade 16a, whereby the blade proper may be made of a high grade tool steel and the supporting blade of a cheaper grade of steel and thereby providing a definite saving as the narrow blade need merely be replaced when sufficiently worn. In the disclosed embodiment the blade being symmetrical, it may be reversed so that either end is available for cutting. Where the blade proper and its support are made separate, the lower edge of the blade and the upper edge of the support are tapered or dove-tailed in the manner disclosed so that they interlock and function as a unit. However, it is to be understood that the blade and support may be made integral.

As disclosed in Figures 1, 2 and 3, the upper surface of the flange 13 of the adaptor 11 is made flush or straight and is interlocked and rigidly retained in the recess provided therefor by means of the set screws 17 which preferably bear against plungers 18 and the latter in turn bear against the upper surface of the flange 13 so as to force the blade and its support downwardly into rigid contact with the inclined edge or shoulder 14. To make this possible, the wall or plate 12 is of a depth somewhat less than that of the combined blade and support.

In Figure 4 is disclosed an alternate construction of adaptor 19 in which the upper surface 20 of the flange 21 is inclined or tapered outwardly and downwardly and the abutting surface of the tool support 6 is tapered or inclined in a like or complementary manner so as to tend to force the adaptor inwardly and downwardly. For most general uses this surface need not be inclined or tapered as we have found that the set screw 17 and plunger 18 abutting the flat outer surface of the adaptor will hold this adaptor and its blade securely in position. Where the flange 21 is inclined, it is preferable that the abutting surface of the plunger 18 be inclined in a like manner so as to give it optimum surface contact with the inclined or tapered surface 20.

Figure 5 discloses a further alternate construction in which the cutting edge 22 of the blade 23 is considerably wider than the body of the blade. In this form the adaptor 24 is provided with a relatively deep slot 25 to accommodate the width of the cutting edge.

To obtain the most effective cutting, the width of the blade and support whether formed separately or integrally, should preferably be approximately one-half the diameter of the cross section of the stock to be cut. Furthermore, the upper surface or cutting edge of the blade is shown disposed in a plane below that of the axis of the fulcrum 5 and the lower surface or edge of the blade or blade support, where a separate support is provided, should be disposed in a plane below the seat or lower surface of the shank, whereby the cutting blade or tool may be most effectively employed. Furthermore, as set forth above, the lower surface of the blade, with or without a separate support, is substantially co-extensive in length with the cutting surface of the blade or tool but of a thickness somewhat less than that of the cutting edge so that the lower edge of the blade may enter the groove cut in the work or stock without danger of binding.

If desired, the upper surface of the flange of the adaptor may be recessed to receive the lower end of the plunger or set screw to lock the adaptor against shifting or displacement.

Having thus described our invention, we claim:

1. Means for mounting a cut-off tool in a tool holder, comprising an adaptor to be received in a recess provided in a face of the tool holder and provided with an overhanging flange at its upper end, and a vertically extending rear wall providing lateral support for the tool throughout a substantial portion of its length, the interior face of the rear wall being recessed adjacent its upper end to receive and retain a cut-off tool having a cutting edge of greater thickness at its upper edge, and means engaging the overhanging flange for forcing the tool downwardly and clamping it between the flange and base of the recess.

2. Means for mounting a cut-off tool in a tool holder provided with a recess having a longitudinally extending and inwardly inclined shoulder against which the lower edge of the tool is clamped, comprising an adaptor for the tool adapted to be received in the recess and provided with an outwardly extending flange at its upper end adapted to bear against the cutting edge of the tool and force the lower edge of the tool against the inclined shoulder and lock the tool in operative position.

3. Means for mounting a cut-off tool in a tool holder, comprising an adaptor to be received in a recess provided in a face of the tool holder having an under-cut shoulder forming the base of the recess, the adaptor being provided with an overhanging flange at its upper end, a vertically extending rear wall providing lateral support for the tool throughout a substantial portion of its length and its lower edge inclined in conformity with the shoulder, and means for applying a vertical gripping action upon the overhanging flange at widely spaced points for forcing the tool downwardly and gripping it between the flange and base of the recess.

4. Means for mounting a cut-off tool in a tool holder, comprising an adaptor to be received in a recess provided in a face of the tool holder and having an inwardly inclined shoulder against which the lower edge of the tool seats, said adaptor being provided with an overhanging flange and a vertically extending rear wall providing lateral support for the tool throughout a substantial portion of its length and width but with its width being less than that of the recess whereby pressure applied directly to the upper surface of the flange forces the tool into clamping engagement with the inclined shoulder of the recess, and means associated with the adaptor and disposed at widely spaced points for locking the adaptor and tool in operative position.

DAVID S. ANTHONY.
WILLIAM B. BLOCKER.